Aug. 10, 1943.   J. D. BROWN   2,326,434
THERMAL JUG
Filed Aug. 24, 1940
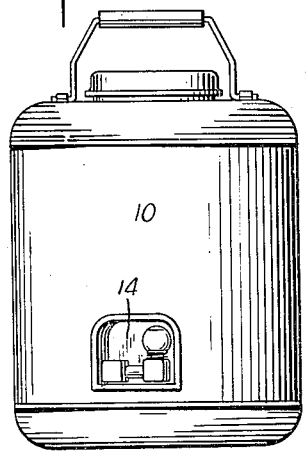
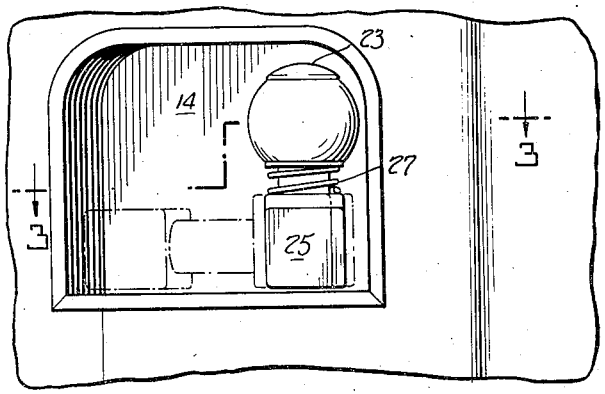
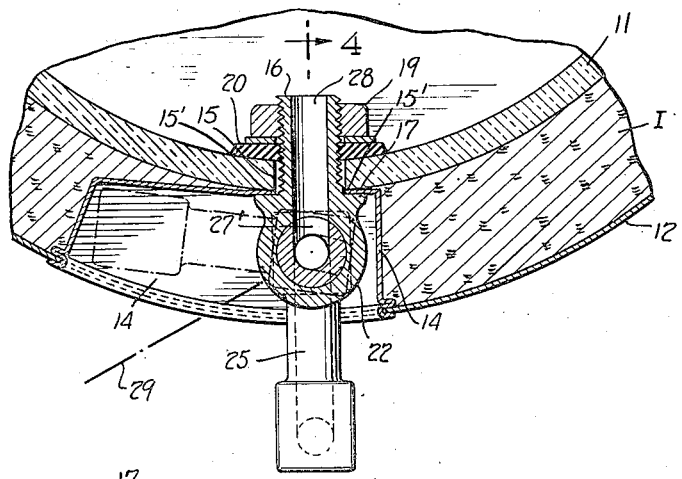
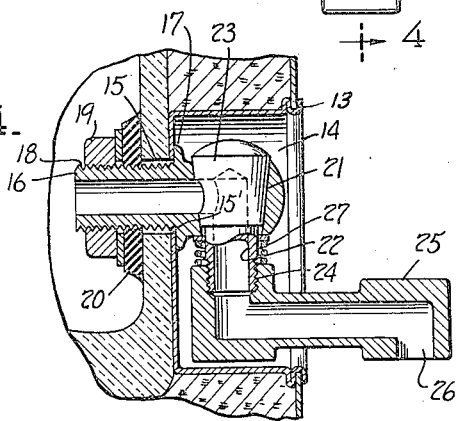
INVENTOR
JOSEPH D. BROWN
BY
ATTORNEY Patented Aug. 10, 1943

2,326,434

UNITED STATES PATENT OFFICE 2,326,434

THERMAL JUG

Joseph D. Brown, New York, N. Y., assignor to Poloron Products, Incorporated, New Rochelle, N. Y., a corporation of New York Application August 24, 1940, Serial No. 354,040

8 Claims. (Cl. 215—13)

The present invention relates to thermal jugs, and is more particularly directed towards providing the thermal jug with an improved form of pouring spout or spigot.

Thermal jugs, ice water coolers and the like are frequently provided with spigots by which the contents of the jug or cooler may be withdrawn. These spigots, as heretofore made, have projected beyond the body of the jug and especially in thermal jugs were liable to cause breakage. The projecting spout would come in contact with foreign bodies and break or crack the jar.

The present invention contemplates a form of pouring spout which can normally be housed in a niche formed between the liner and the outer surface of the casing, this niche having a depth corresponding with the thickness of the insulating material placed between the jar or liner and the outer casing of the thermal jug. In this way the pouring spigot may be swung in out of the way so as to be free of any liability of breakage, and can be swung out whenever it is desired to use it to withdrawn the contents of the jug.

The accompanying drawing shows, for purposes of illustrating the present invention, one of the many embodiments in which the invention may take form, it being understood that the drawing is illustrative of the invention rather than limiting the same.

In this drawing:

Figure 1 is a side elevational view of a thermal jug;

Figure 2 is a fragmentary side elevational view at an enlarged scale;

Figure 3 is an enlarged sectional view on the line 3—3 of Figure 2; and

Figure 4 is a vertical sectional view on the line 4—4 of Figure 3.

The thermal jug 10 shown in the drawing has a conventional frangible liner 11 and outer sheet metal casing 12 provided with a side opening 13 near the bottom which receives a cup shaped stamping 14. The space between the liner 11 and casing 12 is filled with insulation I. The liner 11 has a hole 15 opposite a hole 15' in the stamping 14. A horizontal tubular member 16 has a flange 17 to engage the stamping 14, and a threaded inner end to receive nut 19 and gasket 20, so that the tubular member 16 may be secured in place in the niche formed by the stamping 14. The clamping together of the stamping 14 and liner 11 provides a much more secure fastening for the delivery tube than possible where the conventional spigot is secured in place by a tube extending through the liner and casing.

The outer end of the tubular member 16 has a cone-shaped hole 21, here shown as vertical, and it receives a tubular member 22 having a conical upper end 23 and a threaded lower end 24. The lower end of the tubular member 22 carries another tubular member 25 parallel with the first and having a delivery opening 26. A coiled spring 27 is interposed between the parallel tubular members and acts to hold the cone seated. The tubular member 22 has a port 27', shown more clearly in Figure 3, adapted to align with the passage 28 in the upper tubular member when the device is swung to the full line position of Figure 3. When the lower member 25 is swung to the dot-and-dash line position of Figures 2 and 3, the valve formed by this port 27' is closed, closing taking place at the dot-and-dash line 29.

It will be noted that with the construction shown the downward pressure on the spigot member 25 incident to normal operation will insure keeping the conical members in good contact.

Jugs may be made according to the present invention at substantially the same manufacturing cost as jugs having spigots such as heretofore used. There is a great saving in breakage both during shipment of the jugs and when they are in use, and contamination of the end of the spout is substantially avoided by the present construction, it being less likely that dirt will get into the delivery opening than where the conventional projecting spigot is used, and there is no possibility of an accidental opening as when the usual fixed spigot is employed.

It is apparent that, within the scope of the invention, modifications and different arrangements may be made other than is herein disclosed, and the present disclosure is illustrative merely, the invention comprehending all variations thereof.

What is claimed is:

1. A thermal jug comprising a frangible liner having an opening in the side wall near the bottom, an outer sheet metal casing spaced from the liner to form a space to receive insulation, the casing having an opening opposite the liner opening, a cup shaped stamping secured in the opening in the casing, the stamping extending to the liner wall and being apertured opposite the liner wall opening, a tube extending through the liner opening and the aperture, clamping means for securing the tube and liner and stamping together for mutual reinforcement, and a delivery tube pivoted to the first tube and movable to a position where it may be housed in the stamping or may project out beyond the casing.

2. A thermal jug comprising a frangible liner having an opening in the side wall near the bottom, an outer sheet metal casing spaced from the liner to form a space to receive insulation, the casing having an opening opposite the liner opening, a cup shaped stamping secured in the opening in the casing, the stamping extending to the liner wall and being apertured opposite the liner wall opening, and a spigot including a tube extending through the liner opening and the aperture, clamping means for securing the spigot, tube and liner and stamping together for mutual reinforcement, and a second tube pivoted to the first to swing about an axis close to the liner and having a tubular extension adapted to be housed within the cup shaped member or swing outwardly therefrom to deliver the contents of the jar outside the casing.

3. A thermal jug such as claimed in claim 2, wherein the first and second tubes include parts adapted to be opened when the tubular extension is in the outer position and to be closed when it is in the inner position.

4. A thermal jug such as claimed in claim 2, wherein the second tube has a conical portion provided with a laterally open port and the first tube has a conical seat to receive the cone of the second and dispose the port opposite the opening in the first tube, and the conical parts are held seated by a coiled spring about the second tubular member.

5. A thermal jug such as claimed in claim 2, wherein the second tube is vertical and has a downwardly facing cone to fit an upwardly facing conical seat in the first tube.

6. A thermal jug having a frangible liner, an outer casing spaced from the liner, a member extending from the casing to the outer wall of the liner to form a niche near the bottom of the jug, insulation between the liner and casing, the liner having a hole in the side wall opening into the niche, and a spigot having a member fixedly secured in the hole in the liner, and a delivery member pivoted to the fixed member to swing about an axis traversing the niche so that the delivery member may be housed within the niche or swing out of it, the relatively fixed and stationary members including valve forming elements which open only when the outlet of the deliver member is outside the niche.

7. A thermal jug comprising a frangible liner having a hole in the side wall near the bottom, a horizontal drainage tube secured in said hole and extending outwardly, a vertical tube extending downwardly from the outer end of the first tube, and a second horizontally extending tube extending outwardly from the lower end of the vertical tube, the vertical tube being fixedly secured to one horizontal tube and pivotally connected to the other so that the lower tube may be swung through a horizontal arc, the pivotal connection including a valve which closes when the lower tube is adjacent the liner and opens when it projects away from the liner, and an insulating wall of substantial thickness about the liner, the insulating wall being cut away opposite the hole in the liner wall to provide space to house the exposed tubes when swung inwardly.

8. A thermal jug comprising a frangible liner having a hole in the side wall near the bottom, a horizontal tubular member extending through the hole and fastened to the liner, the outer end of the tubular member having a downwardly converging conical hole, a vertical tubular member having a conical upper end provided with an inlet port adapted to register with the opening in the tubular member and form a valve, adapted to be opened and closed by turning the vertical member on its axis, a delivery tube secured to the lower end of the vertical member and adapted to be used as a handle to open and close the valve, a coiled spring between the upper tubular member and the delivery tube and acting to hold the conical parts together, and an insulating wall of substantial thickness about the liner, the insulating wall being cut away opposite the hole in the liner wall to provide a space to house the vertical tubular member and the delivery tube when in valve closing position, the delivery tube extending beyond the wall of the jug when in position to deliver the contents of the jug.

JOSEPH D. BROWN.